US005633605A

United States Patent [19]
Zimmerman et al.

[11] Patent Number: 5,633,605
[45] Date of Patent: May 27, 1997

[54] DYNAMIC BUS WITH SINGULAR CENTRAL PRECHARGE

[75] Inventors: Jeffrey S. Zimmerman, Essex Junction; John A. Fifield; Christopher P. Miller, both of Underhill; Robert E. Busch, Essex Junction, all of Vt.

[73] Assignee: International Business Machines Corporation, Armonk, N.Y.

[21] Appl. No.: 450,764

[22] Filed: May 24, 1995

[51] Int. Cl.⁶ ............... H03K 19/0185; H03K 19/0944; H03K 19/096

[52] U.S. Cl. ............... 326/86; 326/98; 326/21

[58] Field of Search ............... 326/30, 86, 93, 326/95, 98, 17, 21

[56] References Cited

U.S. PATENT DOCUMENTS

| | | | |
|---|---|---|---|
| 4,488,066 | 12/1984 | Shoji | 326/86 |
| 4,849,658 | 7/1989 | Iwamura et al. | |
| 4,888,685 | 12/1989 | Morinaga et al. | |
| 4,956,820 | 9/1990 | Hashimoto | |
| 5,053,642 | 10/1991 | Ishihara et al. | |
| 5,093,588 | 3/1992 | Ando et al. | 326/86 |
| 5,129,063 | 7/1992 | Sainola et al. | |
| 5,339,448 | 8/1994 | Tanaka et al. | |
| 5,396,601 | 3/1995 | Tokushige et al. | |
| 5,400,284 | 3/1995 | Hanatani et al. | |
| 5,408,436 | 4/1995 | Moloney et al. | |
| 5,416,743 | 5/1995 | Allan et al. | |
| 5,434,520 | 7/1995 | Yetter et al. | 326/93 |
| 5,453,708 | 9/1995 | Gupta et al. | 326/98 |

*Primary Examiner*—Edward P. Westin
*Assistant Examiner*—Jon Santamauro
*Attorney, Agent, or Firm*—Schmeiser, Olsen & Watts; Eugene I. Shkurko

[57] ABSTRACT

A dynamic bus system with a central precharge device is disclosed that utilizes a controller circuit with a one-shot generator and write synchronizing circuits in combination with logic output modules having pull-up/down devices. The issuance of the output enable (OE) signals is interlocked with the turn-off of the precharge. Thus, data is written to the dynamic bus only when the precharge device is inactive, avoiding bus collisions. The resulting circuitry not only ensures the precharging of the bus before the data write to the bus, but will allow the synchronized OE signals to be issued during the same clock phase as the precharge signal.

11 Claims, 2 Drawing Sheets

5,633,605

DYNAMIC BUS WITH SINGULAR CENTRAL PRECHARGE

BACKGROUND OF THE INVENTION

1. Technical Field

The invention relates generally to computer systems with dynamic buses and, more specifically, to a dynamic bus in a computer system with a singular central precharge device.

2. Background Art

One method of writing data to a dynamic bus entails using precharge devices. Precharge devices pull the bus to a logical high or logical low after each data write to charge the bus to a known state before the next data write occurs. In order to accommodate both the data write and the precharging of the buses, the precharge of the prior art bus would be done in one phase of the clock cycle (e.g., the clock high cycle), and the data write, controlled by a delayed output enable (OE) signal, would occur during the other phase of the clock signal (e.g., the clock low cycle). The delaying of the OE signal by a predetermined number of clock cycles ensured that the bus would be precharged before a data write.

U.S. Pat. No. 4,849,658, "Dynamic Logic Circuit Including Bipolar Transistors and Field-Effect Transistors," (issued July 1989 to Iwamura et al. and assigned to Hitachi, Ltd.) discloses a dynamic bus with a precharge cycle, in which the precharging of the bus is done on the clock low cycle and the data is written to the bus on the clock high cycle. The OE signal is delayed so that the precharging of the bus and data write to the bus does not occur simultaneously.

Because the precharge cycle of the prior art requires the complete first phase of the clock cycle (i.e., during the clock low cycle), the OE signal has to wait until the second phase of the clock cycle to issue. Consequently, delaying the OE signal delays the system and thus degrades system performance.

Examples of other dynamic buses and systems with precharge or refresh cycles may be found in the following United States Patents, which are hereby incorporated by reference: U.S. Pat. No. 5,339,448, "Microprocessor With Improved Internal Transmission," (issued August 1994 to Tanaka et al. and assigned to Hitachi, Ltd.); and U.S. Pat. No. 4,956,820, "Arbiter Circuit for Establishing Priority Control of Read, Write, and Refresh Operations With Respect to Memory Array," (issued September 1990 to Hashimoto and assigned to Texas Instruments Inc.).

Although the aforementioned patents provide a way to precharge/refresh systems, all precharging and OE signal issuing is done on a clock edge. The prior art does not disclose a way of precharging with a singular central device that allows the precharge to take place anywhere in the clock cycle. Accordingly, a need has developed in the art for a dynamic bus system that will allow the precharge to take place anywhere in the clock cycle and will issue the OE signal in the same clock cycle as the precharge signal to improve system performance.

SUMMARY OF THE INVENTION

It is thus an advantage of the present invention to provide a dynamic bus system with a singular central precharge that will allow the precharging of the bus to take place anywhere within the clock cycle.

It is another advantage of the invention to provide a dynamic bus system that will allow the output enable signal to issue in the same clock cycle as the precharge signal.

The foregoing and other advantages of the invention are realized by a dynamic bus system with a central precharge device that utilizes a controller circuit with a one-shot generator and write synchronizing circuits in combination with logic output modules having pull-up/down devices.

The controller circuit modifies the clock signal to produce a signal with a very short pulse. This short pulse signal then drives the central precharge device and is combined with output enable (OE) signals to produce synchronized output enable (OE') signals. The OE' signals are then combined with data signals through the logic output modules to turn on/off the pull-up/down devices, thus allowing data to be written on the dynamic bus without waiting for the beginning of a new clock cycle.

BRIEF DESCRIPTION OF DRAWINGS

The foregoing and other objects, features and advantages of the invention will be apparent from the following more particular description of the preferred embodiments of the invention, as illustrated in the accompanying drawings.

DETAILED DESCRIPTION OF THE BEST MODE FOR CARRYING OUT THE INVENTION

Figure 1:
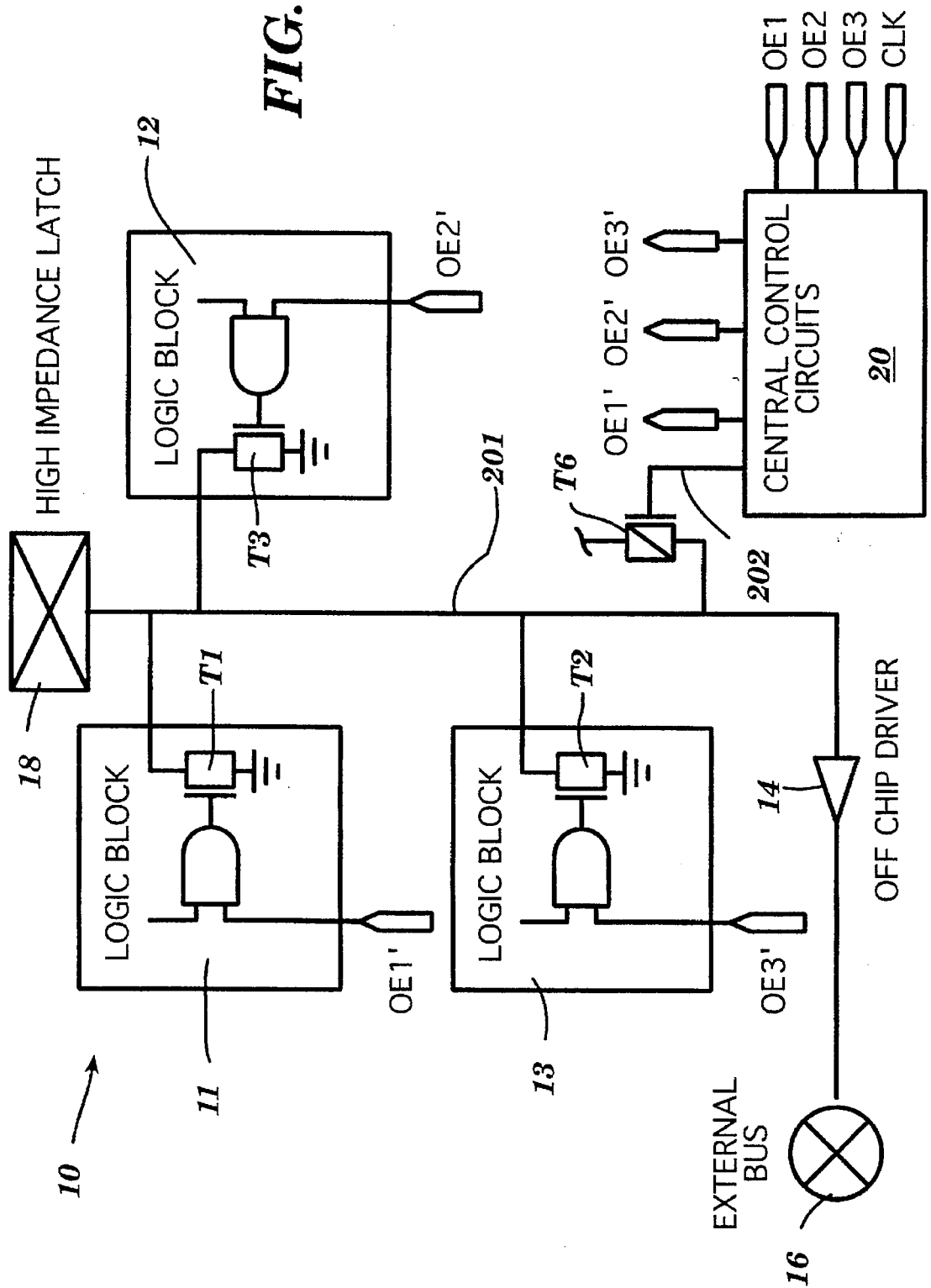
FIG. 1 is a circuit diagram of the present invention.

With reference to FIG. 1, the dynamic bus system architecture 10 of the present invention is shown. In the depicted circuit, a singular central precharge T6 is connected to each line of a 128 bit internal dynamic bus 201 to pull the dynamic bus 201 to a high voltage level during precharge. Logic output modules, or logic blocks 11, 12 and 13, comprise AND gates that "AND" data signals and synchronized output enable (OE') signals (OE1', OE2' and OE3') together. The logic blocks also comprise pull-down devices T1–T3 that connect to the outputs of the AND gates to the dynamic bus 201. The logic blocks 11, 12 and 13 serve as writing devices for writing data to the dynamic bus when the respective OE' signals are issued.

A high impedance latch 18 and an off chip driver 14 are connected to the dynamic bus 201, wherein the off chip driver 14 drives the data to the external bus 16. The central control circuits 20 receive output enable signal inputs (OE1, OE2 and OE3) and a clock signal (CLK). The OE' signals (OE1', OE2' and OE3') and a precharge signal 202 are outputted from the central control circuits 20. The precharge signal 202 turns on/off the singular pull-up precharge device T6. Although P- and N-type transistors are shown for the pull-up/down devices, other suitable devices may also be used and are within the scope of the present invention.

Figure 2:
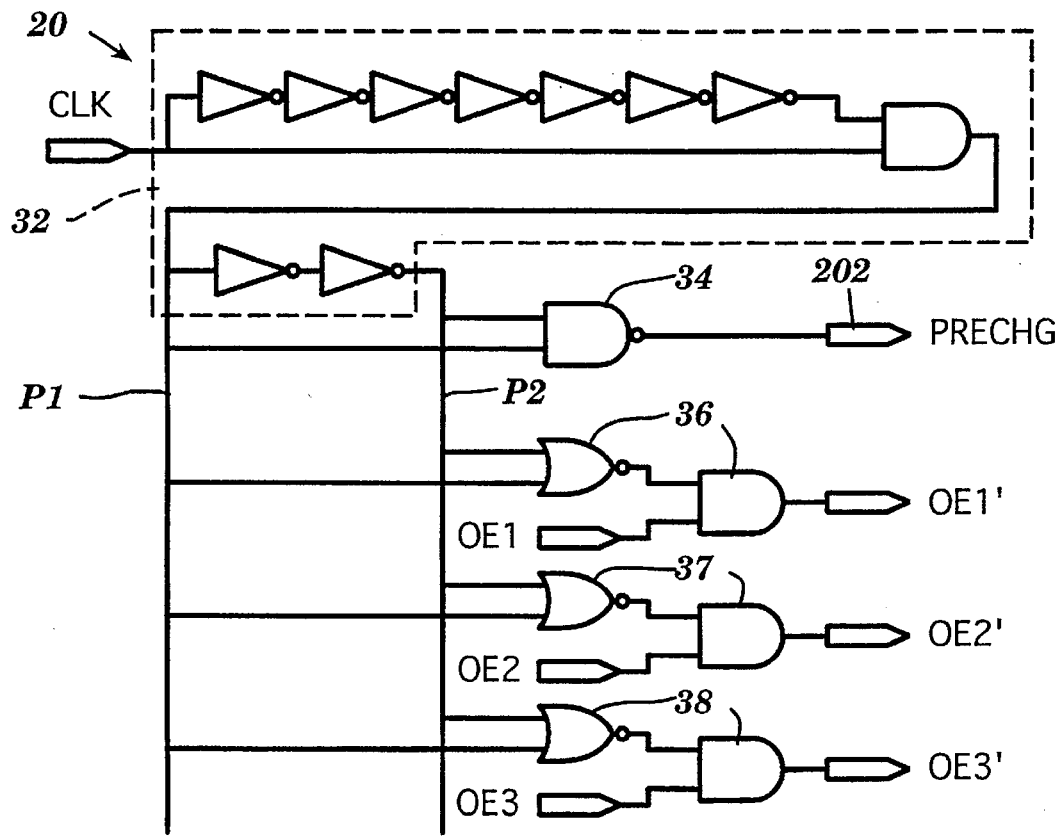
FIG. 2 is an expanded version of the central control circuits of FIG. 1.

FIG. 2 shows the detailed circuitry of the central control circuits 20 of FIG. 1. A pulse generating device 32 comprising a succession of inverters and an AND gate (one-shot generator) produces a first and second pulse, P1 and P2, from an inputted clock signal (CLK). The durations of the first and second pulse are equal to each other, although the second pulse P2 is offset in time from the first pulse P1. Both first and second pulses, P1 and P2, are shorter than the duration of the clock pulse of the signal CLK.

The first and second pulses feed into a first logic device 34 that outputs a precharge signal (PRECHG) 202. The precharge signal (PRECHG) 202 is enabled for a duration shorter than the first pulse duration. The first logic device 34 comprises a NAND gate to "NAND" the first and second pulses together. The shortened pulse (PRECHG) 202 feeds into the precharge device T6 of FIG. 1 to precharge the bus 201 high by turning T6 on. One important aspect of the present invention is that the shortened pulse (PRECHG) 202 does not have to occur at the beginning of a clock cycle. The pulse may occur at anytime during the cycle, with appropriate adjustment to the OE signal, and thus is not restricted by the clock's leading or falling edges.

A second logic device 36, comprising a NOR gate and an AND gate, couples the pulse generating device 32 and output enable input OE1 to logic block 11 as shown in FIG. 1. Similarly, logic devices 37 and 38 couple the pulse generating device 32 and OE inputs OE2 and OE3 to logic blocks 12 and 13, respectively. Synchronized OE' signals (OE1', OE2' and OE3') outputted from the second logic devices 36, 37 and 38, are produced from the OE signal inputs "NANDed" with a "NORed" first and second pulses P1, P2. The issuance of the OE' signals is interlocked with the turn-off of the precharge signal. Thus, data is written to the dynamic bus only when the precharge device is inactive, avoiding bus collisions. The resulting circuitry not only ensures the bus is precharged before data write, but will also allow the OE' signals (OE1', OE2' and OE3') to be issued during the same clock phase as the precharge signal because they are not tied to the next phase of the clock signal.

Figure 3:
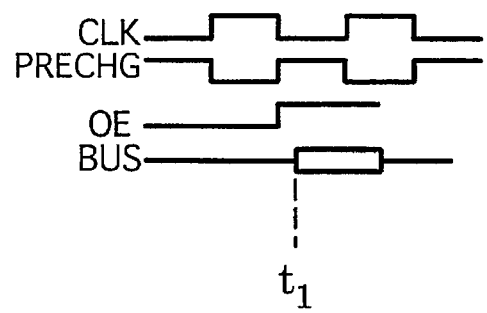
FIG. 3 is the timing diagram for the prior art dynamic bus.
Figure 4:
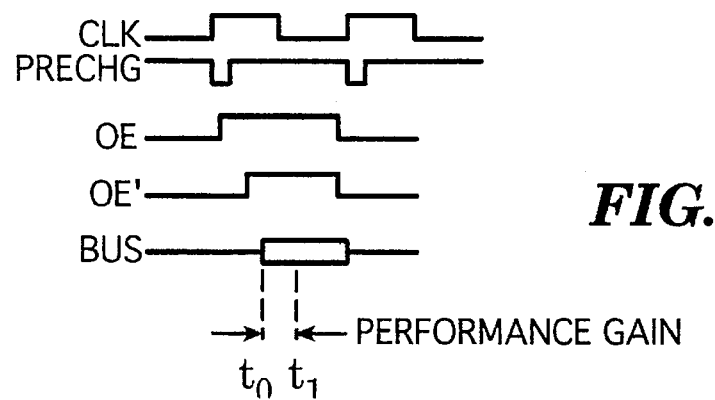
FIG. 4 is the timing diagram for the circuits of FIGS. 1 and 2.

FIGS. 3 and 4 illustrate the difference between the system performances of the prior art dynamic bus system and the present invention's dynamic bus system. The timing chart for the prior art dynamic bus system is illustrated in FIG. 3. As shown, the precharging of the bus is done during the clock high phase of the clock (CLK). The precharge signal (PRECHG) is issued the entire clock high cycle. The clock low phase is used for issuing the OE signal and writing to the bus (BUS). The data is written at time $t_1$.

FIG. 4 shows the timing chart of the present invention. In this illustration, the precharge signal (PRECHG) is issued at the beginning of the clock high phase. Although the precharge signal shown in this example occurs at the beginning of the clock high phase, it may also occur, as aforementioned, any place during the clock cycle and is not limited to the beginning of a clock cycle. Because of the central control circuitry of FIG. 2, the precharge signal (PRECHG) results in a short pulse.

The synchronized OE' signal may then issue after the OE and PRECHG signals are issued. As shown, the shortened (PRECHG) pulse allows for the OE' signal to issue during the same phase of the clock cycle as the precharge signal (PRECHG). Data may then be written to the bus at time $t_0$ instead of $t_1$, as shown in FIG. 3. Thus, the performance gain of the system of the present invention over the prior art system is $t_1-t_0$.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A system for a controlled write to a dynamic bus, comprising:

a) a writing device, coupled to said dynamic bus for writing data to said dynamic bus;

b) a precharge device, coupled to said dynamic bus for precharging said dynamic bus; and c) a control device, coupled to a clock input that receives a clock pulse, said precharge device, an output enable input, and said writing device; said control device for controlling both writing data to said dynamic bus and precharging said dynamic bus, including:

c1) a pulse generating device, coupled to said clock input for generating a first and a second pulse of equal duration wherein said second pulse is offset in time from said first pulse, and the duration of said first pulse and said second pulse is shorter than said clock pulse;

c2) a first logic device, coupled between said pulse generating device and said precharge device for enabling said precharge device for a duration shorter than said first pulse duration; and c3) a second logic device, coupled to said pulse generating device, said output enable input, and said writing device, for enabling writing data to said dynamic bus only when the precharge device is inactive.

2. The system of claim 1, wherein said first logic device generates a precharge pulse that is offset in time from said clock pulse.

3. The system of claim 1, wherein said writing device and said precharge device are enabled in the same clock pulse.

4. A method for synchronizing a controlled write to a dynamic bus with a precharging of the dynamic bus, comprising the steps of:

a) inputting a clock pulse into a pulse generating device;

b) generating with said pulse generating device a first pulse and a second pulse of equal duration from said clock pulse, wherein said second pulse is offset in time from said first pulse, and the duration of said first pulse and said second pulse is shorter than said clock pulse;

c) generating a precharge pulse from said first pulse and said second pulse, wherein the duration of said precharge pulse is shorter than said first pulse;

d) enabling a precharge device for said duration of said precharge pulse;

e) generating a synchronized output enable signal from said first pulse and said second pulse; and f) enabling a writing device with said synchronized output enable signal for writing data on said dynamic bus only when said precharge device is inactive.

5. The method of claim 4, wherein said precharge pulse is offset in time to said clock pulse.

6. The method of claim 4, wherein said writing device and said precharge device are enabled in the same clock pulse.

7. A system for a controlled write to a dynamic bus, comprising:

a) a writing device, coupled to said dynamic bus for writing data to said dynamic bus;

b) a precharge device, coupled to said dynamic bus for precharging said dynamic bus; and c) a control device having a first input coupled to a clock signal line and a second input coupled to an output enable signal line, and having a first output coupled to said precharge device and a second output coupled to said writing device; said control device including:

c1) a first logic device, coupled between said clock input and said precharge device for enabling said precharge device for a duration shorter than said clock pulse; and c2) a second logic device, electrically interlocked with said first logic device and coupled to said writing device for enabling writing data to said dynamic bus immediately upon turn off of said precharge device.

8. The system of claim 7, wherein said enabling of said precharge device, said turn off of said precharge device and said enabling writing data to said dynamic bus occur within the same clock cycle.

9. A system for controlled write to a dynamic bus, comprising:
   a) a writing device, coupled to the dynamic bus for writing data to the dynamic bus for writing data to the dynamic bus;
   b) a precharge device, coupled to the dynamic bus for precharging the dynamic bus; and
   c) control means for controlling the precharge device to perform precharging the dynamic bus in a single phase of a clock cycle, and for controlling the writing device to perform writing of the data to the dynamic bus during the single phase of the clock cycle, said control means having a first input coupled to a clock signal line, a second input coupled to an output enable signal line, a first output coupled to said precharge device and a second output coupled to said writing device.

10. The system of claim 9, wherein the control means further comprises:
    a) a clock input; and
    b) A first logic device, coupled between the clock input and the precharge device for enabling the precharge device for a duration shorter than the single phase of the clock cycle.

11. The system of claim 10, wherein the control means further comprises:
    a second logic device, electrically interlocked with the first logic device and coupled to the writing device for enabling data to be written to the dynamic bus immediately upon turning off of the precharge device.

* * * * *